(12) United States Patent
Celik et al.

(10) Patent No.: US 9,276,739 B2
(45) Date of Patent: Mar. 1, 2016

(54) METHOD AND APPARATUS FOR ENCRYPTING/DECRYPTING DATA (75) Inventors: Mehmet Utku Celik, Eindhoven (NL); Boris Skoric, Eindhoven (NL); Pim Theo Tuyls, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 605 days.

(21) Appl. No.: 12/305,063

(22) PCT Filed: Jun. 29, 2007

(86) PCT No.: PCT/IB2007/052530
§ 371 (c)(1),
(2), (4) Date: Dec. 16, 2008

(87) PCT Pub. No.: WO2008/001327
PCT Pub. Date: Jan. 3, 2008

(65) Prior Publication Data
US 2009/0208019 A1 Aug. 20, 2009

(30) Foreign Application Priority Data
Jun. 30, 2006 (EP) .................... 06116450

(51) Int. Cl.
*H04L 9/08* (2006.01)
*H04L 29/06* (2006.01)
*H04L 9/00* (2006.01)

(52) U.S. Cl.
CPC .............. *H04L 9/085* (2013.01); *H04L 9/0861* (2013.01); *H04L 63/0478* (2013.01); *H04L 2209/60* (2013.01)

(58) Field of Classification Search
CPC ...... H04L 9/085; H04L 9/0861; H04L 9/0866
See application file for complete search history.

(56) References Cited

U.S. PATENT DOCUMENTS

| 5,764,767 | A  | * | 6/1998 | Beimel et al. ............... 713/180 |
| 6,035,398 | A  | * | 3/2000 | Bjorn ........................... 713/186 |
| 6,182,214 | B1 | * | 1/2001 | Hardjono .................... 713/163 |
| 6,219,794 | B1 | * | 4/2001 | Soutar et al. ................ 726/18 |
| 6,363,485 | B1 |   | 3/2002 | Adams et al. |

(Continued)

FOREIGN PATENT DOCUMENTS

| WO | 03103216 A2 | 12/2003 |
| WO | 2005025122 A1 | 3/2005 |
| WO | 2005059629 A1 | 6/2005 |

OTHER PUBLICATIONS

Menezes, Alfred J. "Handbook of Applied Cryptography," 1997, CRC Press, pp. 40, 172, 493, 520, 561-563.*

(Continued)

*Primary Examiner* — Darren B Schwartz
(74) *Attorney, Agent, or Firm* — Larry Liberchuk (57) ABSTRACT

A method of encrypting data using a first key and multiple encryption keys at least in part based on the first key. The method includes encoding the data into a redundant representation by distributing the information content of the data among a number of groups, each group being associated with a respective encryption key of the multiple encryption keys, each encryption key being associated with at least one group, the redundant representation allowing recovery of the data in the absence of the groups associated with the at least one of the multiple encryption keys, and encrypting each group by the respective associated encryption key.

26 Claims, 4 Drawing Sheets

(56) References Cited

U.S. PATENT DOCUMENTS

| | | | |
|---|---|---|---|
| 6,782,475 B1* | 8/2004 | Sumner | 713/163 |
| 6,980,659 B1* | 12/2005 | Elliott | 380/277 |
| 2002/0164033 A1* | 11/2002 | Rajasekaran | 380/278 |
| 2003/0084020 A1* | 5/2003 | Shu | 707/1 |
| 2003/0088782 A1* | 5/2003 | Forrest | 713/186 |
| 2004/0049687 A1* | 3/2004 | Orsini et al. | 713/189 |
| 2004/0117649 A1 | 6/2004 | Whyte | |
| 2004/0148509 A1* | 7/2004 | Wu | 713/186 |
| 2004/0208316 A1* | 10/2004 | Wack et al. | 380/44 |
| 2005/0105736 A1* | 5/2005 | Chen et al. | 380/277 |
| 2006/0072763 A1 | 4/2006 | You et al. | |
| 2006/0083372 A1* | 4/2006 | Chang et al. | 380/44 |
| 2006/0161791 A1* | 7/2006 | Bennett | 713/193 |
| 2006/0265595 A1* | 11/2006 | Scottodiluzio | 713/180 |
| 2007/0160198 A1* | 7/2007 | Orsini et al. | 380/28 |
| 2007/0223706 A1* | 9/2007 | Gantman et al. | 380/286 |
| 2008/0049938 A1* | 2/2008 | Singhal | 380/277 |

OTHER PUBLICATIONS

Dodis, Yevgeniy et al. "Fuzzy Extractors: How to Generate Strong Keys from Biometrics and Other Noisy Data," Advances in Cryptology—EUROCRYPT 2004 International Conference on the Theory and Applications of Cryptographic Techniques, May 2-6, 2004, LNCS v. 3027, pp. 523-540.*

Menezes, Alfred J. "Handbook of Applied Cryptography," 1996, CRC Press Inc, pp. 11-15.*

Amit Sahai, et al.: "Fuzzy Identity-Based Encryption" Eurocrypt 2005, vol. 3494, May 22, 2005, XP002460090.

Yevgeniy Dodis, et al: Fuzzy Extractors: How to Generate Strong Keys from Biometrics and Other Noisy Data.

Ari Juels, et al; A Fuzzy Vault Scheme, ISIT 2002, Lausanne, Switzerland, Jun. 30-Jul. 5, 2002.

Ai-Fen Sui, et al: Separable and Anonymous Identity-Based Key Issuing Identity-based cryptography, Department of Computer Science, The University of Hong Kong.

A. Shamir: "Identity-Based Cryptosystems and Signature Schemes" Proceedings of Crypto 1984.

D. Boner, et al: "Identity-Based Encryption for the Weil Pairing" Proceedings of Crypto 2001.

C. Cocks: "An Identity Based Encryption Scheme Based on Quadratic Residues" Proceedings of IMA 2001, LNCS 2260.

* cited by examiner

METHOD AND APPARATUS FOR ENCRYPTING/DECRYPTING DATA

FIELD OF THE INVENTION

The present invention relates to a method and apparatus for encrypting data by means of a first key, a method and apparatus for decrypting encrypted data by means of a second key, a signal comprising data encrypted by means of a first key, and a computer program product comprising program code means stored on a computer-readable medium for performing one of the methods according to the present invention.

BACKGROUND OF THE INVENTION

In present-day society, information is predominantly stored in a digital manner. Digital data can be reproduced, transmitted and stored in a simple manner and thus provides great ease of use. However, this ease of use also entails a potential privacy and security risk in the form of access by unauthorized parties. In order to cope with privacy and security issues, valuable information is often encrypted.

Encryption effectively forms a barrier that blocks unauthorized persons from accessing the information while allowing authorized persons to access the information. When encrypting information, data is generally encrypted by means of an encryption key resulting in encrypted data. In order to provide security, the encrypted data should not provide an outsider with information regarding the original data. In order to recover the data from the encrypted data, it needs to be decrypted by means of a decryption key corresponding to the encryption key.

Most encryption schemes use keys to encrypt and decrypt information. Data is encrypted by means of an encryption key and the encrypted data is decrypted by means of a decryption key. Two different types of encryption can be distinguished: symmetric encryption, wherein both the encryption and decryption key are the same, and asymmetric encryption, wherein the encryption and decryption keys differ. Although the encryption and decryption keys in asymmetric cryptography are different, they form a pair of keys, hereinafter referred to as "key pair", and use of other keys in combination with either the encryption or the decryption key will result in loss of data.

A relatively new trend is the use of biometric data as a source of key information in cryptography. Biometric data is derived from preferably unique physical features of an individual that are preferably stable over time. Examples of biometric modalities that are often used for access control are modalities such as fingerprints, palm prints, iris images, and facial characteristics. Biometric data is often used to provide individual access control.

Apart from the fact that the physical features of an individual may change, biometrics derived from such physical characteristics are acquired through measurement and/or detection. As a result, biometrics are often noisy. This noise may result from e.g. acquisition noise, the use of different sensors, different environmental conditions, and/or minor changes in the physical features of the individual. In order to reduce noise and derive more robust and more discerning data, there is a trend to derive feature vectors from the biometric measurement(s). However, feature vectors still exhibit a considerable variation and are thus inappropriate for use as key information. There has therefore been much research in order to derive robust keys from noisy data in biometrics.

"Fuzzy identity-based encryption" by A. Sahai and B. Waters published in Proceedings of EUROCRYPT, 2005 discloses a different approach that uses noisy data as a key in an Identity Based Cryptosystem. This particular scheme has the disadvantage that the noisy encryption key used to encrypt the data is also required for decrypting the encrypted data.

SUMMARY OF THE INVENTION

It is an object of the present invention to provide a solution that alleviates the need for exact key information in encryption and/or decryption by allowing encryption of data by means of a first key and subsequent decryption of the encrypted data by means of a second key without the need for the first key, provided that the first and the second key form a sufficient estimate of an encryption/decryption key pair.

This object is realized by a method of encrypting data as defined in claim 1 and a method of decrypting data as defined in claim 12.

When using a noisy encryption key and/or a noisy decryption key that jointly form an estimate of an encryption/decryption key pair, there is no certainty that data encrypted with the noisy encryption key can be decrypted with the noisy decryption key.

In order to be able to alleviate problems related to the use of an incorrect encryption/decryption key pair, the present invention encrypts the data by using multiple encryption keys, which multiple encryption keys are based at least in part on the first key. At least one of the multiple encryption keys comprises key information that is not present in the respective other encryption keys.

Before encrypting the data, it is encoded in a redundant representation. This encoding operation comprises distributing the information content of the data among a number of groups. Distributing may comprise e.g. full and/or partial duplication of data among the groups. Each group is associated with an encryption key and each encryption key is in turn associated with at least a group.

The redundant representation allows recovery of the data from the redundant representation in the absence of the groups associated with the at least one of the multiple encryption keys. This implies that the other groups of the redundant representation must comprise all the information content comprised in the original data.

Once a group of data is encoded, it can be encrypted. Each group in the redundant representation is encrypted by means of the respective associated encryption key. Once encrypted, the encrypted groups forming the encrypted data can be stored or transmitted for further use.

In order to decrypt data that was encrypted according to the present invention, a second key is used. The first and the second key form an estimate of an encryption/decryption key pair. During decryption, the encrypted data is decrypted by using multiple decryption keys. The multiple decryption keys are generated by using information similar to that used for generating the multiple encryption keys. However, when generating the decryption keys, the second key is used instead of the first key.

Each multiple decryption key is associated with a respective one of the multiple encryption keys, thereby forming multiple pairs of encryption keys and associated decryption keys. Ideally, when there are no mismatches between encryption keys and associated decryption keys, each encryption key and the associated decryption key form a correct encryption/decryption key pair. Groups encrypted by means of a respective one of the encryption keys can be successfully decrypted by means of the associated decryption key. However, if noise disturbs either an encryption key and/or the associated decryption key, the information content of the data comprised in the group encrypted by means of this encryption key will be garbled when it is decrypted by means of the associated decryption key.

The decoding operation following the decryption exploits the redundancy that is added when the data are being encoded. The redundancy in the redundant representation of claim 1 can be used to at least compensate for errors in the groups associated with the at least one of the multiple encryption keys. If noise occurs in the key information that is solely present in the at least one of the multiple encryption keys, all associated groups will be garbled, but the redundant representation still comprises all information content related to the data in the other groups.

The decoding operation comprises extracting the information content related to the data from at least one or more correctly decrypted groups. Whether or not more than one correctly decrypted group is required depends on the actual redundant representation used. Claims 1 and 12 therefore at least alleviate the need for exact key information in encryption and/or decryption.

The encryption and decryption method according to the present invention provides a solution that allows encryption of data by means of a first key and subsequent decryption of the encrypted data by means of a second key without the need for the first key, provided that the first and the second key form a sufficient estimate of an encryption/decryption key pair.

In an embodiment, the redundant representation at least allows recovery of the data from the redundant representation in the absence of the groups associated with any single one of the multiple encryption keys. It is therefore no longer relevant which one of the key pairs is incorrect.

In a further embodiment, the first key and/or the second key comprise data from a noisy source of key information. A good example of a noisy source of key information is a feature vector derived from a biometry. In an even more advantageous embodiment, the feature vector is spread evenly over the multiple encryption keys. The probability of a key error for the resulting encryption keys (and decryption keys) is thus significantly lower than the probability of error of the feature vector.

In yet a further embodiment, the data is encrypted by using at least three encryption keys and the information content of the data is spread over at least three groups. Spreading here implies partial duplication of data in groups, but explicitly excludes duplication of the data in its entirety. By using a larger number of encryption keys, the probability of error per encryption key may be lowered. Moreover, by spreading the amount of data over a larger number of groups, the amount of data affected by the use of an incorrect encryption/decryption key pair can be reduced. Both factors can contribute to an increased probability of data recovery.

Spreading data also affects the corresponding method of decryption. The corresponding method of decryption therefore uses at least three decryption keys. In order to recover the data from the redundant representation, information content of multiple decrypted groups will have to be recovered and combined.

In a further embodiment, the key information used to form the encryption keys is disjunctive. An error in a particular piece of information solely used to form one of the multiple encryption/decryption keys will thus only affect a single encryption/decryption key. Consequently, the probability of occurrence of an incorrect encryption/decryption key pair will be reduced. Subsequently, the probability that encrypted groups are garbled when decrypting the encrypted data will also be reduced. It will be clear to the skilled person that this particular characteristic can be combined in an advantageous manner with the previous embodiments that reduce the probability of error of the encryption key/decryption key errors and the impact of such an error on the amount of data affected.

In a further embodiment, the encryption used is Identity Based Encryption, hereinafter referred to as IBE. The present invention allows encryption of data by using a noisy identity and subsequent decryption of the encrypted data without the need to have the exact noisy identity available during decryption. In doing so, the present invention provides a solution that does not expose the identity used to encrypt the data.

In a first advantageous variant of the above embodiment, the key information used to form a respective one of the multiple encryption key comprises: noisy identity information and noise-free identity information. While using the noise-free identity information, the party generating the multiple decryption keys can thus verify whether the identity of the party included in the key information is the same as, or is trusted by, the recipient of the multiple decryption keys.

In a second advantageous variant of the embodiment, wherein the encryption is IBE, the key information used to form each respective encryption key comprises: noisy identity information and a descriptor identifying the relationship of the noisy identity information with one or more sources of key information. The party generating the multiple decryption keys thus has a recipe available for generating the decryption keys.

In an embodiment of the present invention, the encoding operation further comprises the application of a secret sharing scheme wherein the shares are distributed among groups. This particular type of redundant representation provides improved security as at least n out of k shares are required in order to obtain any information regarding the original data.

In a further embodiment, the encoding operation further comprises the incorporation of an error-detecting code in a group, the error-detecting code covering at least the information content of the data comprised in the group. Consequently, it is possible to determine with statistical certainty that the data present in a decrypted group is valid. The complexity of such error detection codes may be chosen in dependence on the required robustness.

In a preferred embodiment of the present invention, codewords of an error-correcting code form the redundant representation. The codewords can be used to correct garbled groups in case an encryption/decryption key pair was incorrect, thereby allowing the recovery of groups in spite of the use of an incorrect encryption/decryption key pair.

In an even more preferred embodiment, every group comprises multiple symbols and the symbols of every group are part of a codeword of an error-correcting code. Moreover, every codeword comprises at most one symbol from a respective group. Use of an incorrect encryption key/decryption key pair will thus result in at most one symbol error per codeword. Consequently, a minimum amount of parity symbols is required to compensate for garbled groups.

The skilled person will recognize that each embodiment of the encryption method can be mirrored in a corresponding decryption method. These encryption and corresponding decryption methods jointly provide solutions that alleviate problems related to the use of an estimate of a first key for encryption and a second key for decryption together forming an estimate of an encryption/decryption key pair. Moreover, they do not require the first key to be available for decryption.

It is evident that there will be a limit to the extent that the redundant representation can cope with incorrect encryption keys and associated decryption keys. This is hardly surprising as, in order to provide security, the encrypted data should only be accessible on the condition that the first key is a sufficient estimate of the second key.

In a practical system, the maximum tolerable difference between the first and the second key may be selected by the sender, or may also be a predetermined communication system value. The maximum tolerable difference will generally be a trade-off involving factors such as:
the choice of the type of redundant representation,
the maximum allowable overhead,
the maximum number of keys available,
the size of the key space, and
the probability of aliasing keys of different users within the key space.

The object of the invention is further realized by an apparatus for identity-based encryption as defined in claim 17 and an apparatus for identity-based decryption of encrypted data as defined in claim 18.

BRIEF DESCRIPTION OF THE DRAWINGS

These and other aspects will be further elucidated and described with reference to the drawings in which.

Throughout the drawings, the same reference numerals refer to the same elements, or elements that perform the same function.

DETAILED DESCRIPTION OF EMBODIMENTS

Figure 1:
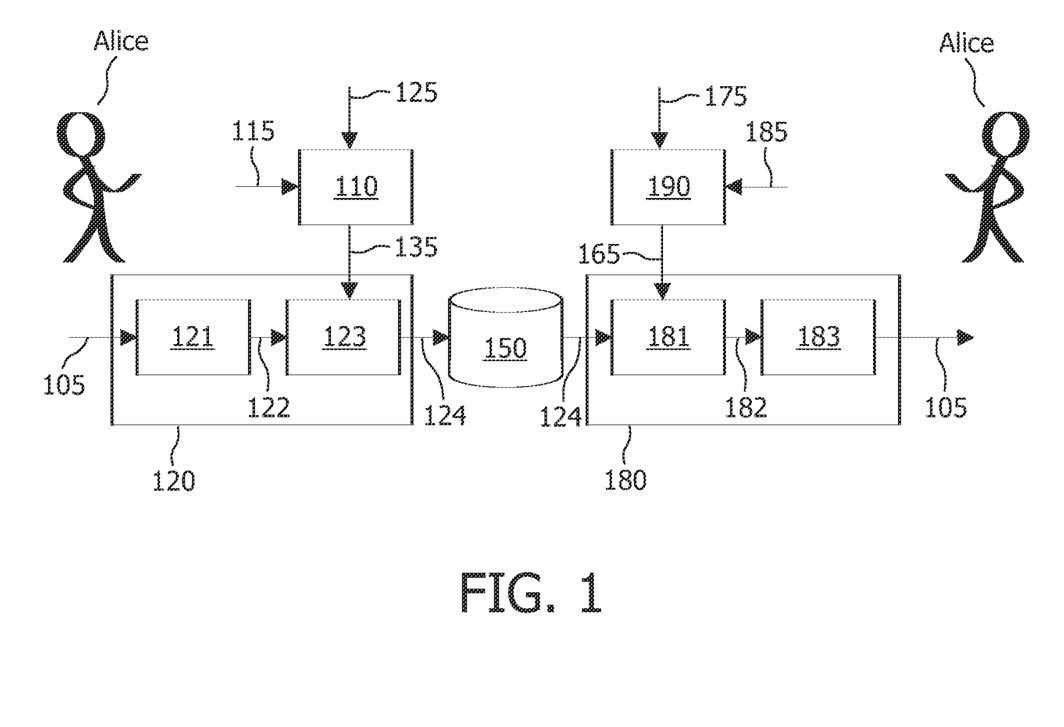
FIG. 1 is a schematic representation of data encryption and subsequent decryption according to the present invention.

FIG. 1 is a schematic representation comprising the encryption of data and subsequent decryption of data according to the present invention.

A first party, Alice, wants to store data 105 in a database 150. In order to prevent unauthorized parties from accessing the data 105, Alice encrypts the data. Most encryption schemes, both symmetric and asymmetric, use keys for encrypting data. Here we assume that Alice is using symmetric cryptography. In symmetric cryptography, the encryption and decryption key is one and the same key. In order to warrant privacy/security, the encryption key/decryption key has to be kept private.

Keys can take on a variety of shapes ranging from numbers, or strings, to complete sentences comprising a plurality of characters. Keys ideally have a large entropy. A good key therefore often appears as being random data. However, such random keys are not very suitable for use by human beings. Biometric data derived from a physical feature of an individual may be used as a source of key information instead. Biometric data resulting from a fingerprint or an iris scan provides a substantial amount of high entropy information that can be used as key information. Unfortunately, biometric data tends to be noisy, even when using feature vector extraction.

The present invention provides a solution that alleviates this problem by allowing data encryption by means of a first key in the form of a noisy feature vector 115 and subsequent decryption of the encrypted data by means of a second key in the form of a further noisy feature vector 185. As both feature vectors are essentially an estimate of one and the same physical feature, they can be interpreted as being an estimate of an encryption/decryption key pair for a symmetric encryption scheme.

In the scenario depicted in FIG. 1, Alice encrypts data 105 by using an apparatus 120 for data encryption. The apparatus 120 for data encryption requires multiple encryption keys 135 in order to encrypt the data 105. In this particular scenario, the multiple encryption keys are formed while using two sources of key information:
the feature vector 115 derived from Alice's fingerprint, and
a passphrase 125 known to Alice.

The passphrase 125 and the feature vector 115 are used by an encryption key generator 110 for generating the required multiple encryption keys. Although in this particular embodiment, the encryption key generator 110 is not comprised in the apparatus 120, it can be readily combined with this apparatus. Based on the available key sources 115, 125, the encryption key generator 110 generates multiple encryption keys 135 comprising the information content of the feature vector 115.

In this embodiment, each respective encryption key comprises a different segment of the passphrase and a different segment of the feature vector. Assuming that the probability of error of the passphrase is zero, the probability of a key error in each respective one of the multiple encryption keys will be lower than the probability of error in the feature vector 115. As a result of imperfect recollection or typos by Alice, the probability of error of the passphrase will generally not be zero. In this particular scenario, the present invention will also compensate for these errors.

The apparatus 120 for data encryption comprises an encoding means 121 and an encryption means 123. The encoding means is arranged to encode the data into a redundant representation 122. The encoding operation comprises distributing the information content of the data 105 among a number of groups. Each of these groups is associated with a respective encryption key from the set of multiple encryption keys 135. In turn, each encryption key is associated with at least one group. The redundant representation 122 at least allows recovery of the data 105 from the redundant representation 122 in the absence of the groups associated with any three of the multiple encryption keys 135. The encryption means 123 can start encrypting the groups forming the redundant representation 122 when they come available. Each group is encrypted by means of the respective associated encryption key.

When, at a later moment in time, Alice wants to access the data 105 from the encrypted data 124, she will have to obtain multiple decryption keys 165. The multiple decryption keys 165 may be generated before Alice encrypted the message or, alternatively, she may do so after the data is encrypted. A further feature vector 185 is required to generate the multiple decryption keys.

Each one of the multiple decryption keys is associated with a respective one of the multiple encryption keys, effectively forming multiple pairs of encryption keys and associated decryption keys. The multiple decryption keys 165 are generated by means of a decryption key generator 190. As this particular scenario involves symmetric cryptography, the decryption key generator 190 is identical to the encryption key generator 110. In the case of asymmetric cryptography, the same inputs will be used in a similar manner, but different key generators are required.

To generate the decryption keys, Alice enters a further passphrase 175 and provides the further feature vector 185. Using this data as input, the decryption key generator 190 subsequently generates the corresponding multiple decryption keys 165. The decryption keys are generated in a manner analogous to that used to generate the encryption keys.

Ideally, when the inputs of the encryption key generator 110 and the decryption key generator 190 are identical, all encryption/decryption key pairs will be correct. In the case of a symmetric cryptographic scheme, this implies that each encryption key and the associated decryption key are identical. In practice, it is likely that at least one encryption/decryption key pair will be incorrect due to noise in the acquisition process.

The apparatus 180 for decrypting encrypted data comprises a decryption means 181 and a decoding means 183. The decryption means 181 is arranged to decrypt the encrypted groups. Each encrypted group is decrypted by means of the respective decryption key associated with the encryption key used to encrypt the group. The decrypted groups 182 output by the decryption means 181 may comprise groups that are correctly decrypted and/or groups that are garbled during decryption.

The decoding means 183 is arranged to decode the data from the decrypted groups 182 by extracting information content related to the data from at least one or more correctly decrypted groups. In this scenario, wherein the redundant representation allows recovery of the data even when the groups associated with any three encryption keys are absent, at most three incorrect pairs of encryption keys and associated decryption keys can be compensated for.

Although it is possible to recover the encrypted data 105 from the decrypted groups by using a trial-and-error approach, it is preferred to fit each group during encoding with an error-detecting code, thereby providing a simple facility to establish whether a group was correctly decrypted.

The above example shows how the present invention may be used in a symmetric cryptosystem. It may, however, be applied to equal advantage in a system employing asymmetric cryptography. Keys in asymmetric cryptography are usually referred to as public and private keys. The terms public and private refer to the intended key exposure. A public key may be distributed to everyone, whereas a private key should be kept private. A message encrypted with a public key can be decrypted with the corresponding private key. Conversely, a message encrypted with a private key can be decrypted with a corresponding public key. Public and private keys form pairs, wherein either key can be used for encryption as long as the other key is used for decryption.

The use of the present invention in an asymmetric cryptographic scheme using an Identity Based Cryptographic scheme will be examined in the following paragraphs.

The first identity-based cryptosystem was an Identity Based Signature (IBS) scheme, suggested by A. Shamir in "Identity-based Cryptosystems and Signature Schemes", published in the proceedings of CRYPTO '84, herein incorporated by reference. Although Shamir disclosed an IBS scheme, the first Identity Based Encryption (IBE) schemes were disclosed by two parties independently of one another, namely D. Boneh and M. Franklin in "Identity-Based Encryption from the Weil Pairing", published in the Proceedings of CRYPTO 2001, and by C. Cocks in "An Identity Based Encryption Scheme Based on Quadratic Residues", published in the Proceedings of IMA 2001, LNCS 2260, both herein incorporated by reference.

IBE schemes are asymmetric encryption schemes that can be used for encrypting and decrypting data. In an IBE scheme, data sent by a sender, hereinafter referred to as Alice, is encrypted by using a public key derived from the identity of the recipient, hereinafter referred to as Bob. When Bob receives the encrypted data from Alice, he can use a private key derived from his identity to decrypt the encrypted data.

The public key in this scheme is based on Bob's identity. This identity might be his name and birthday, or alternatively his e-mail address, as long as Alice and Bob agree on the format. Anyone with access to this identity can subsequently generate a public key for use in the IBE scheme by using one or more shared public keys from a trusted authority, hereinafter referred to as TA. Any party with access to the relevant data can generate the public key for encrypting data for Bob.

The TA, or a party trusted by the TA, generates the corresponding private key. In order to generate the private key, the TA uses Bob's identity and one or more of its private keys corresponding to the one or more of its public keys of the TA as used by Alice. The resulting private key is then sent to Bob.

There has been a growing interest in creating IBE schemes wherein the identity data of the recipient is noisy. An approach to tackling this problem can be found in "Fuzzy identity-based encryption" by A. Sahai and B. Waters published in Proceedings of EUROCRYPT, 2005. This particular scheme has the disadvantage that it requires the noisy identity as used by Alice to encrypt the data to be sent together with the encrypted data to Bob. In doing so, Alice will inadvertently expose Bob's identity to eavesdroppers.

In contrast, the present invention allows encryption of data by means of multiple encryption keys based on the noisy identity of Bob as used by Alice, as well as subsequent decryption of the data by means of multiple decryption keys based on a further noisy identity of Bob. In a method according to the present invention, there is no need to have the noisy identity of Bob, as used during encryption, available during decryption. Consequently, Bob's identity remains hidden from eavesdroppers.

Figure 2:
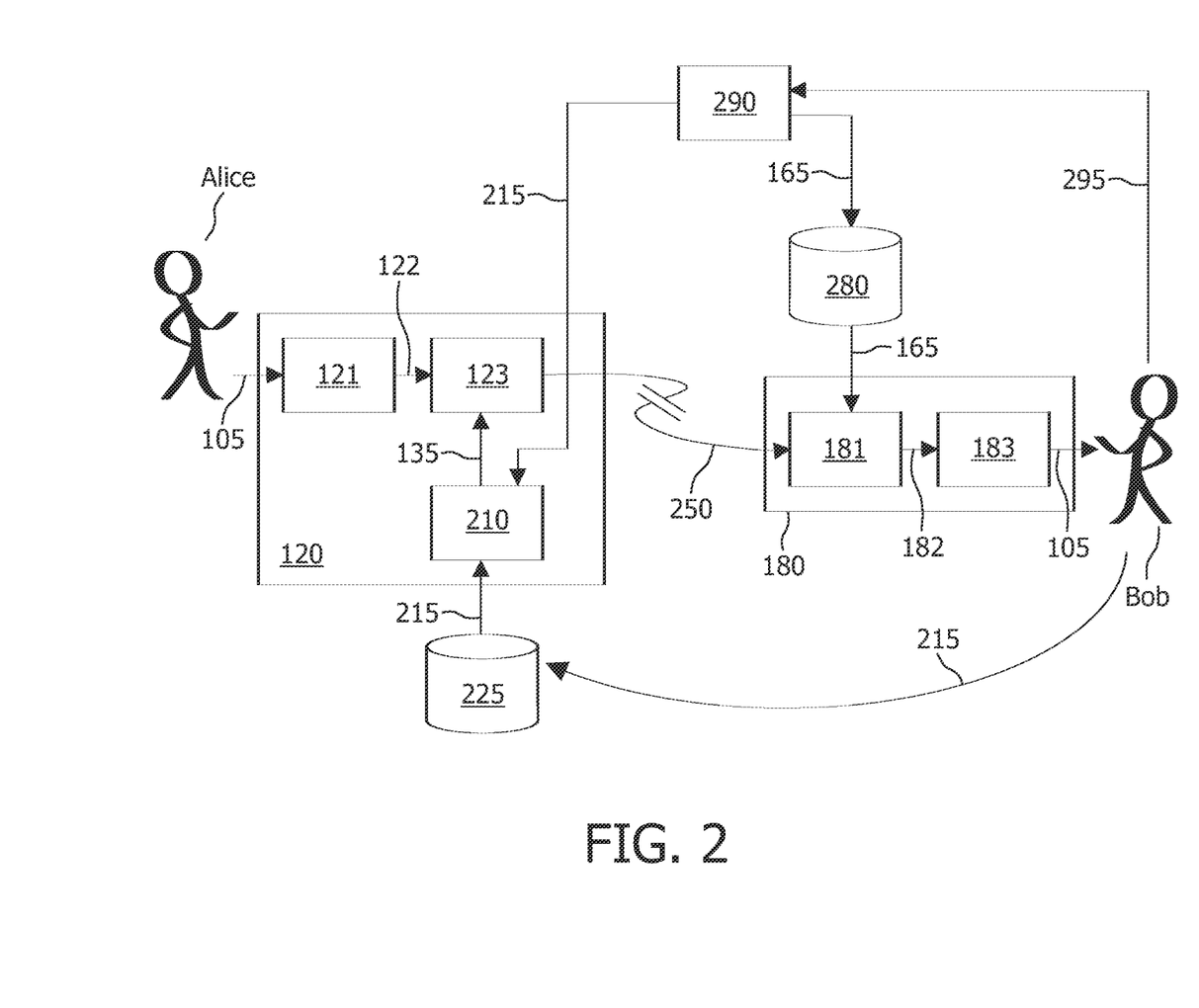
FIG. 2 is a schematic representation of a scenario of identity-based encryption and decryption according to the present invention.

FIG. 2 is a schematic representation depicting a scenario involving noisy identity-based encryption and decryption according to the present invention. Alice and Bob are friends who would like to exchange data. Bob has supplied Alice with a first feature vector 215 derived from one of Bob's fingerprints. Alice has stored the first feature vector in a database 225 for use in encrypting messages intended for Bob.

Alice uses a data encryption apparatus 120 comprising an encoding means 121 and an encryption means 123 according to the present invention. The apparatus further comprises an encryption key generation means 210. The encryption key generation means 210 uses one or more public keys of a TA 290 in combination with the first feature vector 215 to generate multiple encryption keys 135. The multiple encryption keys 135 are subsequently used by the encryption means 123 to encrypt the redundant representation 122. The encrypted data 250 is sent to Bob.

In order for Bob to decrypt the encrypted data 250, he will need to obtain a set of multiple decryption keys. To this end, Bob provides the TA 290 with a second feature vector 295. The second feature vector 295 results from a further acquisition procedure of a fingerprint as used for generating the first feature vector 215. The second feature vector 295 can be considered as an estimate of the first feature vector 215.

The TA 290 uses the second feature vector 295 and one or more of its private keys to generate multiple decryption keys 165. It is important that the TA 290 knows which private keys to use and how to combine them with the second feature vector 295. Using this knowledge and provided that the first feature vector 215 and the second feature vector 295 are identical, the TA 290 can generate multiple decryption keys 165 that form correct encryption key/decryption key pairs. In practice, however, the feature vectors will differ and one or more mismatches may occur in the respective multiple encryption keys 135 and associated decryption keys 165.

The decryption keys 165 generated by the TA 290 are sent to Bob who stores them in a database 280. Once Bob has access to the multiple decryption keys 165, he can start the decryption process of decrypting the encrypted data 105, for which he uses an apparatus 180. The decryption process is similar to that in FIG. 1 but involves an asymmetric decryption algorithm rather than a symmetric decryption algorithm.

Although, in the above example, the encryption and decryption keys are based solely on noisy key information, it will be clear to the skilled person that additional noise-free identity information may be added such as e.g. Bob's name and date of birth without affecting security. The additional noise-free identity information will in turn enable the TA 290 to verify whether the identity of the person for whom the (private) decryption keys are generated corresponds to the party receiving the decryption keys.

In a further advantageous embodiment, each respective decryption key is formed while using key information comprising:
    noisy identity information,
    noise-free identity information, and
    a descriptor identifying the relationship of the noisy identity information with one or more sources of key information.

The TA 290 can thus match the identity associated with the keys with that of the recipient of the decryption keys but, moreover, the descriptor provides the TA 290 with a recipe of how to generate the respective decryption keys.

Even more preferably, the noisy identity information is spread over a large number of encryption keys so that every encryption key comprises only a small quantity of noisy identity information. The probability of error for each respective one of the multiple encryption keys may thus be significantly lower than when all noisy information is used to generate a single key.

It is clear from the foregoing that the choice of the redundant representation does not only have an impact on the size of the encrypted data, but also on the probability of recovery from the use of incorrect key pairs of encryption keys and associated decryption keys.

A wide variety of redundant representations can be used in combination with the present invention, for example:
1. Duplication-based representation
    Duplicate the information content of the data in every group
2. Spreading or partial duplication-based representation
    Partial duplication of the information content of the data in every group, thereby spreading the information content of the data over the groups
3. Secret sharing-based representation
    Spreading information over shares and spreading the shares over groups
4. Error-correcting code codeword-based representation
    Create a representation wherein all groups are covered by codewords of an error-correcting code Each of the above types of redundant representation can be used individually or in combination in order to provide a noise robust representation.

The present invention improves the probability of successfully recovering the information content related to the data when the key information used to encrypt and/or decrypt the data is noisy.

The probability of success can be improved by using various effects, one of which is the result of the use of multiple encryption/decryption keys comprising the key information from the first/second key, respectively. At least one of the multiple encryption/decryption keys comprises key information that is not used in the other encryption/decryption keys. The probability of error in each of the other encryption/decryption keys will thus be lower than the probability of error of the first/second key, respectively, simply because the other encryption/decryption keys do not comprise all key information that can cause such errors.

By using a large number of keys and distributing the information content of the first/second key among multiple encryption/decryption keys, the probability of error in the respective ones of the multiple encryption/decryption keys can be further reduced.

Moreover, by creating a redundant representation comprising a number of groups and encrypting groups with a different one of the multiple encryption keys, the probability of success may be further improved.

In the case of duplication, this is the direct result of duplicating the data in multiple groups and encrypting them with different encryption keys, preferably formed by using disjunctive key information. As a result, not only the probability of error per key will be lower, but also the probability of success increases with every group added, as each individual group suffices to recover the data.

In the case of partial duplication, there is the same advantage, provided that the number of groups required to recover the data is smaller than the total number of groups. The data can therefore be recovered in various ways, thereby increasing the probability of success with every additional group. In this situation, an additional advantage is that, contrary to the situation involving duplication, only part of the original data needs to be duplicated for every additional key resulting in a more efficient ratio of size over the number of keys used than a duplication scheme.

A secret sharing scheme shares the first advantage of the partial duplication scheme in that n out of k shares suffice to recover the original message. Moreover, the secret sharing scheme provides additional security, as a hacker who can recover a single share from the redundant representation does not learn anything about the encrypted data.

If the redundant representation comprises codewords of an error-correcting code, the reduction of the probability of an encryption/decryption key pair error applies, but in addition the codewords can help to cope with garbled data in the case of such a key error.

The distribution of groups among the codewords is relevant in this particular case. By (preferably evenly) spreading the information comprised in the respective groups over the respective codewords, the impact of an encryption/decryption key-pair error on the codewords is reduced. As a result, the amount of redundancy needed to cope with a predetermined maximum number of encryption/decryption key-pair errors can be reduced. This particular effect also coincides with the use of multiple keys, as the use of multiple keys allows reduction of the information content related to the data in the respective groups, thereby reducing the total number of symbol errors resulting from an encryption/decryption key-pair error.

Figure 3:
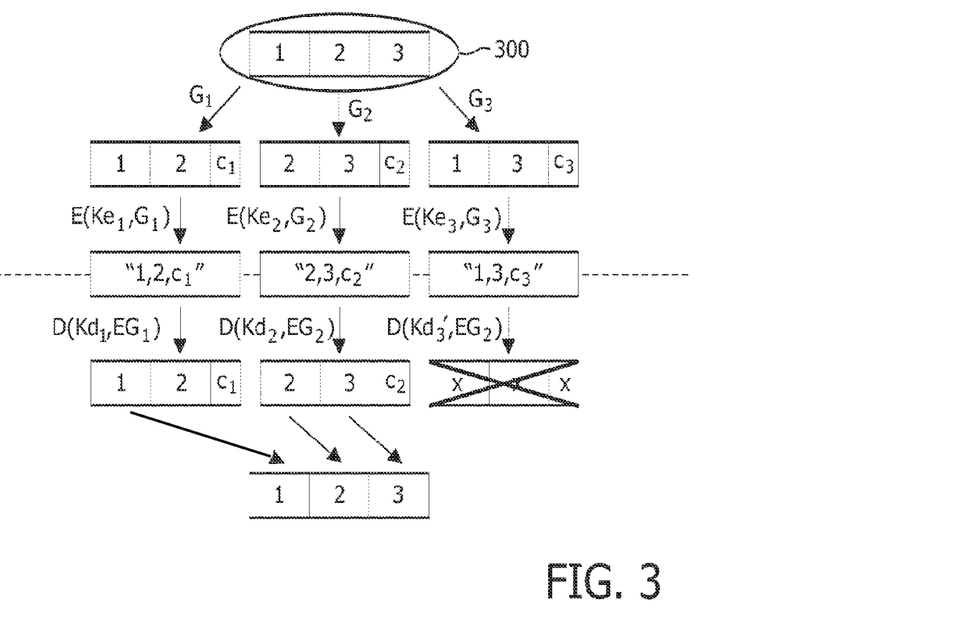
FIG. 3 is a first redundant representation of data for use in a method according to the present invention.

FIG. 3 shows an example of a redundant representation applying spreading through partial duplication of information. This particular representation involves three encryption/decryption keys and allows successful recovery when a single encryption/decryption key-pair mismatch occurs.

The data 300 is partitioned into three equal-sized parts here denoted by 1, 2, and 3. Subsequently, three groups named $G_1$, $G_2$, and $G_3$ are created. Each of these groups comprises two different parts from the original data, each group being different from the other groups. Subsequently, an error-detecting code in the form of $c_1$, $c_2$, and $c_3$, respectively, is appended to each group. The error-detecting codes may range from a single parity symbol to a more complex code. Subsequently, each group is encrypted by means of one of the multiple encryption keys $Ke_1$, $Ke_2$, and $Ke_3$.

In the example depicted in FIG. 3, each encrypted group is subsequently decrypted by means of a corresponding decryption key $Kd_1$, $Kd_2$, and $Kd_3'$, wherein $Kd_3'$ differs from the decryption key $Kd_3$ that would have correctly decrypted the encrypted third group $G_3$. As a result of this difference, the encrypted group $G_3$ will be garbled during decryption.

After decryption, the error-detecting codes in the decrypted groups are evaluated in order to ascertain whether the data obtained after decryption is valid. The error in the decrypted group $G_3$ can thus be found with a statistical certainty depending on the strength of the error-detecting code. When the decryption error is found, the original data 300 may be recovered by using the information content stored in the remaining two groups that were correctly decrypted.

FIG. 3 illustrates that duplication of information may be used to generate a redundant representation in a straightforward manner. Furthermore, it illustrates that it is possible to use partial duplication. When partial duplication is used, a variety of representations may be constructed that require n out of k parts for reconstruction (n>2), without having to duplicate the entire data to be encrypted for every one of the multiple encryption/decryption keys. Consequently, however, multiple groups are required to recover the data in the case of an encryption/decryption key-pair mismatch.

Figure 4:
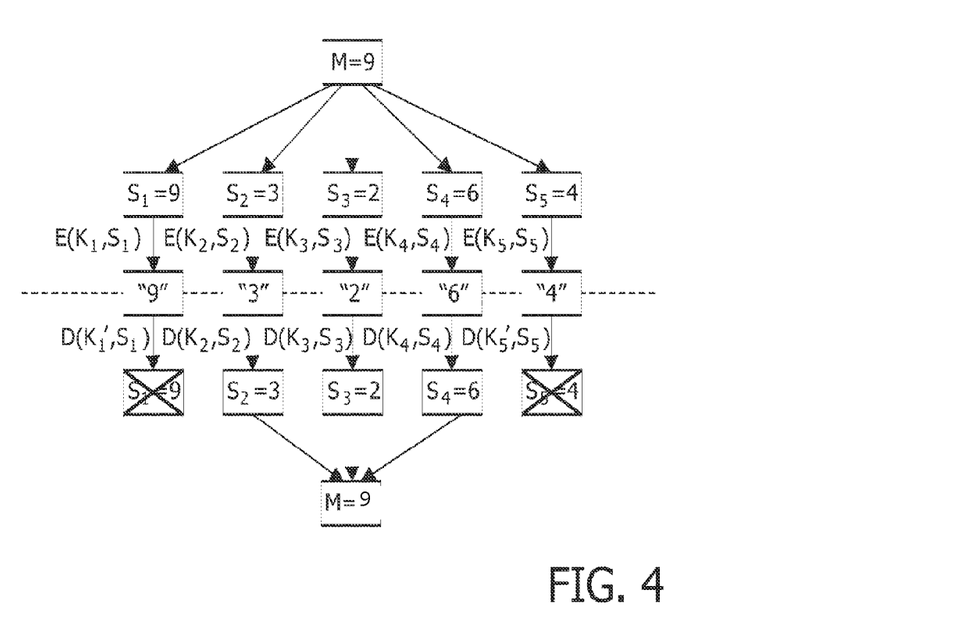
FIG. 4 is a second redundant representation of data for use in a method according to the present invention.

FIG. 4 illustrates a further redundant representation that employs secret sharing. In an n out of k secret sharing scheme, data is encoded in k shares. In order to decode the original data, n out of the k shares are required (n>2). Each individual share as such does not provide any information with respect to the original message.

FIG. 4 depicts a simple example, using a 3 out of 5 LaGrange Interpolating Polynomial Scheme. In order to generate the shares, a polynomial of degree n−1 is selected, wherein M is the data to be encoded:

$$F(x)=(ax^2+bx+M) \bmod p,$$

wherein $p$ is prime, p>a, and p>b.
The polynomial used in FIG. 4 is:

$$F(x)=(8x^2+3x+9) \bmod 11$$

The next five shares are generated by calculating five values of F(x):

$$F(1)=S_1=9$$

$$F(2)=S_2=3$$

$$F(3)=S_3=2$$

$$F(4)=S_4=6$$

$$F(5)=S_5=4$$

Each share is subsequently encrypted by using one of the multiple encryption keys, $\{K_1, \ldots, K_5\}$. Now suppose that two of the five encrypted shares are lost due to an encryption/decryption key-pair mismatch. Suppose that only $S_2$, $S_3$, $S_4$ can be reconstructed, we need to solve the following set of linear equations:

$$a*2^2+b*2+M=3$$

$$a*3^2+b*3+M=2$$

$$a*4^2+b*4+M=6$$

Solving this set of equations will yield a=8, b=3, and M=9. The above example illustrates that, even though several groups may be lost, the original message may be reconstructed. Moreover, the individual shares do not provide any information with respect to the encrypted data.

In a preferred embodiment of the invention, the above secret sharing scheme is combined with an error-detecting code, preferably an error-detecting code that is appended to the original data before creating the shares. Consequently, decrypting an encoded message would comprise decrypting the shares, subsequently selecting n shares, decoding the data, and then verifying whether the decoded data is correct.

Figure 5:
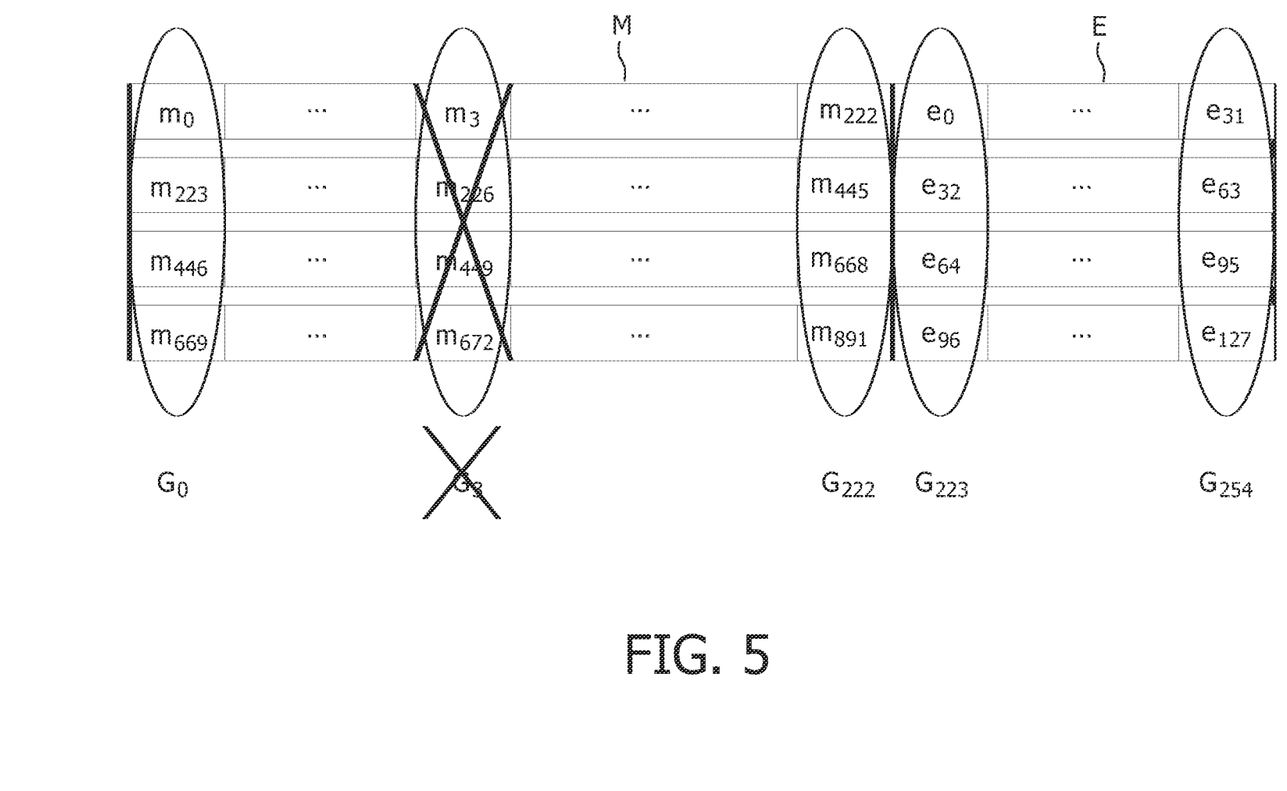
FIG. 5 is a third redundant representation of data for use in a method according to the present invention.

FIG. 5 is a further advantageous redundant representation wherein codewords from an error-correcting code form the redundant representation. The redundant representation in FIG. 5 uses a Reed Solomon code. Reed Solomon codes use symbols for representing data and parity. This particular example involves RS(255,223) that uses 8-bit symbols. The codewords of RS(255,223) are based on a primitive polynomial, in this case:

$$P(x)=1+x^2+x^3 x^4+x^8$$

Each codeword comprises 255 bytes, 223 data bytes and 32 parity bytes. The RS(255,223) error-correcting code allows recovery of the encrypted data in the presence of 16 symbol errors per codeword.

As the use of an incorrect encryption/decryption key pair causes all symbols in a group encrypted/decrypted with these keys to be garbled, the codewords of the data bytes of the error-correcting code should not coincide with the data symbols in a single group. In a preferred embodiment, each group is covered by as many codewords as possible. Ideally, every symbol in a codeword corresponds to a different group. Error resilience is improved by spreading the symbols of a group over as many codewords as possible.

FIG. 5 shows how 892 data bytes numbered $m_0$ to $m_{891}$ can be spread over four codewords. The four codewords are shown vertically, each codeword comprising 255 symbols and each symbol of a codeword being part of one of 255 groups. Each group in turn comprises four symbols, one symbol in each codeword.

The 255 groups include 223 groups comprising data ranging from $G_0$ to $G_{222}$ and 32 groups comprising parity symbols ranging from $G_{222}$ to $G_{255}$. Each one of the groups, data and parity alike, are encrypted by using one of 255 encryption keys ranging from $K_0$ to $K_{255}$.

If an incorrect encryption/decryption key pair is used, all symbols encrypted/decrypted with these particular keys will be garbled. This is illustrated in FIG. 5 by the cross through $G_3$. Consequently, each of the four codewords comprises only a single incorrect symbol. This particular redundant representation may thus correct 16 encryption/decryption key-pair mismatches.

In the redundant representation as shown in FIG. 5, every incorrect encryption/decryption key pair will affect all four codewords in the same position. This is a direct result of the distribution of the groups among the codewords. It is important to note that, regardless of which symbols belong to a group, all symbols in a group will be garbled as a result of an incorrect encryption/decryption key pair. Once it is known which group fails, it is known which symbols are incorrect.

Certain error-correcting codes are adept to handle known symbol errors in an efficient manner. When provided with the locations of errors, the above RS(255,223) will be able to handle 32 known symbol errors rather than 16 unknown symbol errors. In this situation, it is important to know which groups are garbled.

In a preferred embodiment of the present invention that involves an error-correcting code supporting the identification of known errors, each group comprises a checksum to establish group integrity. The group integrity indication may thus be used to flag such errors.

The above examples of redundant data representations clearly indicate the wealth of redundant representations available for use with the present invention. Moreover, the aforementioned examples indicate that, with an increasing number of keys, the probability of a failure resulting from the use of incorrect encryption/decryption key pairs can be reduced.

In a particularly advantageous embodiment of the present invention, a redundant representation using an error correction code is combined with an IBE scheme. Consider an IBE scenario according to the present invention, wherein Alice transmits an encrypted message to Bob. The message is encrypted by Alice using multiple encryption keys based on: a first instance of Bob's biometric identity, his name and date of birth. In order to decrypt the message encrypted by Alice, Bob obtains multiple decryption keys based on a second instance of his biometric identity, his name and date of birth. The first and second instances of Bob's identity may both be considered as an estimate of his identity. In order to use an IBE scheme, Alice and Bob use a TA that has a set of Public Values, such as public keys that can accommodate a regular IBE.

DEFINITIONS IN THIS EMBODIMENT v is a fixed unique identity, here the concatenation of the Name and Date of Birth of Bob; Name||Date of Birth
$L_w$ is the length of the biometric identity in symbols
Z is the alphabet to which the symbols belong
w is a first instance of Bob's biometric identity, $w \in Z^{L_w}$
w' is a second instance of Bob's biometric identity, $w' \in Z^{L_w}$, $w \neq w'$ In order for Alice to send the message to Bob in a secure manner, Alice and Bob have to obtain encryption keys and decryption keys, respectively. In order to generate the encryption keys, the TA is given both v and w' by Bob. The TA verifies that both v and w' belong to Bob. Using both v and w', the TA generates a set of $L_w$ decryption keys, one decryption key $D_{v\|i\|w'_i}$ for each symbol of the second instance of Bob's biometric identity, wherein $w'_i$ is the $i^{th}$ symbol of the second instance of Bob's biometric identity. Alice in turn uses v and w to generate a set of $L_w$ encryption keys, one encryption key $E_{v\|i\|w_i}$ for each symbol of the first instance of Bob's biometric identity, wherein $w_i$ is the $i^{th}$ element of the first instance of Bob's biometric identity.

Alice then encrypts the message M that she wants to communicate to Bob. First, the message M is encoded to a redundant representation. Alice selects the maximum allowable difference between w and w', which difference is at most $d_A$ elements. Subsequently, Alice selects a suitable error-correcting code $C(n; k; d_A)$ that is capable of correcting $d_A$ errors in strings of length $n=L_w$.

She arranges the message M in rows $M_r$, wherein each row has length k. She encodes each row independently, yielding encoded rows $M_r^E$.

As a result of the encoding process, each encoded row has $n=L_w$ elements after encoding. Alice then encrypts each column of the encoded message by using the generated encryption keys, resulting in an encrypted message comprising $L_w$ encrypted columns: $E(E_{v\|8\|w_i}, M_C^E)$. The encrypted message is sent to Bob.

Bob receives the encrypted message comprising the encrypted columns and decrypts each column i by using the associated decryption key $D_{v\|8\|w'_i}$. If w=w', all columns will be correctly decrypted. If w≠w', one or more columns will be garbled during decryption. In order to compensate for the garbled data, Bob decodes each row by using the error-correcting code. In order to recover the message, Bob will have to know what error-correcting code was used to encode the data, and, to do so, Alice can supply Bob with the relevant parameters. Alternatively, the error-correcting code can be standardized.

In the process, the rows of n elements, which may comprise incorrectly decrypted elements, are mapped onto codewords of the error-correcting code. If the number of errors in w with respect to w' is sufficiently small, i.e. less than $d_A$, the error-correcting code is capable of correctly decoding M. Bob can thus successfully recover the message M from the rows.

Although the present invention has been generally explained with reference to keys that are based on noisy data, it can be applied to equal advantage in a scenario in which noise-free key material is used, but in which, due to other influences, such as a noisy transmission channel, a poor quality storage or a poor quality data carrier is obtained as long as there is a substantive probability that sufficient encryption/decryption key pairs are incorrect. The present invention can also be readily applied in situations involving noisy key material from sources other than from biometrics, such as e.g. responses from physical uncloneable functions.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. Use of the article "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of encrypting data comprising:
communicating, by at least one processor, with a biometric device configured to collect a noisy source of data;
obtaining, by the at least one processor, a noisy source of key information based at least partially on the noisy source of data;
generating, by the at least one processor, a first key based at least partially on the noisy source of key information;
distributing, by the at least one processor, unique segments of the noisy source of key information across multiple encryption keys such that at least one of the multiple encryption keys include a segment that is not present in other encryption keys of the multiple encryption keys;
encoding, by the at least one processor, the data by distributing the data redundantly among a number of groups, each group being associated with a respective encryption key of the multiple encryption keys; and encrypting, by the at least one processor, each group by the respective associated encryption key.

2. The method of claim 1, wherein the groups are configured to allow recovery of the data when an encryption key and decryption key pair do not correspond.

3. The method of claim 1, wherein the multiple encryption keys comprise at least three encryption keys and the data is distributed across three groups.

4. The method of claim 1, wherein key information used to form the respective encryption keys is disjunctive.

5. The method of claim 1, wherein the noisy source of data comprises biometric information.

6. The method of claim 1, wherein key information used to form a respective one of the multiple encryption keys comprises:
   noisy identity information, and
   noise-free identity information.

7. The method of claim 1, wherein key information used to form each respective encryption key comprises:
   noisy information, and
   a descriptor identifying a relationship of the noisy information with one or more sources of key information.

8. The method of claim 1, wherein the encoding further comprises at least one of:
   applying, by the at least one processor, a secret sharing scheme wherein the shares are distributed among groups, and
   incorporating, by the at least one processor, an error-detecting code in a respective group, the error-detecting code covering at least the data comprised in the group.

9. The method of claim 1, wherein the encoding further comprises incorporating, by the at least one processor, an error-correcting code in the groups.

10. The method of claim 9, wherein each group comprises multiple symbols, each multiple symbol of each group being part of a codeword of the error-correcting code, and every codeword comprising at most one symbol of the respective group.

11. A method of decrypting encrypted data comprising:
   communicating, by at least one processor, with a biometric device configured to collect a noisy source of data;
   obtaining, by the at least one processor, a noisy source of key information based at least partially on the noisy source of data;
   generating, by the at least one processor, a first key and a second key for forming an estimate of an encryption/decryption key pair, wherein the second key comprises data from the noisy source of key information;
   decrypting, by the at least one processor, the encrypted data using multiple decryption keys in which each of the multiple decryption keys contain a unique segment of the noisy source of key information such that at least one of the multiple decryption keys includes a segment of the noisy source of key information that is not present in other decryption keys of the multiple decryption keys;
   decrypting, by the at least one processor, at least one or more encrypted groups using a respective decryption key of the multiple decryption keys that is associated with the encryption key used to encrypt the group; and
   decoding, by the at least one processor, the data from the at least one or more decrypted groups by extracting content related to the data from at least one or more decrypted groups.

12. The method of claim 11, wherein decoding the data comprises at least one of:
   using, by the at least one processor, a secret sharing scheme on shares comprised in multiple decrypted groups, and
   validating, by the at least one processor, a respective group by verifying an error-detecting code incorporated in the decrypted group.

13. The method of claim 11, wherein decoding the data comprises:
   error-correcting, by the at least one processor, at least one or more decrypted groups using an error-correcting code, and
   extracting, by the at least one processor, content related to the data in the at least one or more decrypted groups.

14. An apparatus for encrypting data comprising:
   a biometric device configured to collect a noisy source of data;
   a memory;
   at least one processor coupled to the memory and the biometric device, the at least one processor being configured to:
   communicate with the biometric device;
   obtain a noisy source of key information based at least partially on the noisy source of data;
   generate a first key based at least partially on the noisy source of key information;
   distribute unique segments of the noisy source of key information across multiple encryption keys such that at least one of the multiple encryption keys include a segment that is not present in other encryption keys of the multiple encryption keys;
   distribute data redundantly among a number of groups, each group being associated with a respective encryption key of the multiple encryption keys; and
   encrypt each group using the respective associated encryption key.

15. An apparatus for decrypting encrypted data comprising:
   a biometric device configured to collect a noisy source of data;
   a memory;
   at least one processor coupled to the memory and the biometric device, the at least one processor configured to:
   communicate with the biometric device;
   obtain a noisy source of key information based at least partially on the noisy source of data;
   generate a first key and a second key forming an estimate of an encryption/decryption key pair, wherein the second key comprises data from the noisy source of key information;
   decrypt the encrypted data using multiple decryption keys in which each of the multiple decryption keys contain a unique segment of the noisy source of key information such that at least one of the multiple decryption keys includes a segment of the noisy source of key information that is not present in other decryption keys of the multiple decryption keys;
   decrypt at least one or more encrypted groups with the respective decryption key associated with the encryption key used to encrypt the group; and
   decode original data from the at least one or more decrypted groups by extracting content related to the original data from at least one or more decrypted groups.

16. A non-transitory computer-readable medium storing a computer program, the computer program comprising instructions which, when executed, cause at least one processor to:

communicate with a biometric device configured to collect a noisy source of data;

obtain a noisy source of key information based at least partially on the noisy source of data;

generate a first key based at least partially on the noisy source of key information;

distribute unique segments of the noisy source of key information across multiple encryption keys such that at least one of the multiple encryption keys include a segment that is not present in other encryption keys of the multiple encryption keys;

encode the data by distributing the data redundantly among a number of groups, each group being associated with a respective encryption key of the multiple encryption keys; and         encrypt each group by the respective associated encryption key.

17. An apparatus for encrypting data comprising:

a biometric device configured to collect a noisy source of data;

a memory;

at least one processor coupled to the memory and the biometric device, the at least one processor being configured to:

communicate with the biometric device to generate a noisy feature vector based on the noisy source of data, the noisy feature vector representing an estimate of at least one physical feature of a user;

generate multiple encryption keys such that each encryption key is based at least partially on a unique segment of the noisy feature vector;

distribute data among a number of groups such that each group comprises at least a partially redundant representation of the data, the groups allowing recovery of the data, if decryption of some of the groups is unsuccessful, each group being associated with an encryption key of the multiple encryption keys; and     encrypt each group using an associated encryption key of the multiple encryption keys.

18. The apparatus for encrypting data of claim 17, wherein each encryption key is further based on a unique segment of noise free identity information.

19. The apparatus for encrypting data of claim 17, wherein decryption of a given group is unsuccessful when there is a difference between the noisy feature vector used to generate the encryption key for encrypting the given group and the noisy feature vector used to generate a decryption key for decrypting the given group.

20. The apparatus for encrypting data of claim 17, wherein recovery of the data is allowed when decryption of at most three groups is unsuccessful.

21. The apparatus for encrypting data of claim 17, wherein each group of data further comprises an error detecting code.

22. An apparatus for decrypting data comprising:

a biometric device to collect a noisy source of data;

a memory;

at least one processor coupled to the memory and the biometric device, the at least one processor being configured to:

communicate with the biometric device to generate a noisy feature vector based on the noisy source of data, the noisy feature vector representing an estimate of at least one physical feature of a user;

generate multiple decryption keys such that each decryption key is based at least partially on a unique segment of the noisy feature vector;

decrypt a number of groups of data using at least one of the multiple decryption keys, each group of data comprising at least a partially redundant portion of original data such that recovery of the original data is possible, if decryption of some of the groups is unsuccessful; and     recover the original data by extracting information from at least one encrypted group of data that is successfully decrypted with at least one of the multiple decryption keys.

23. The apparatus for decrypting data of claim 22, wherein each decryption key is further based on a unique segment of noise free identity information.

24. The apparatus for decrypting data of claim 22, wherein decryption of a given group is unsuccessful when there is a difference between the noisy feature vector used to generate an encryption key for encrypting the given group and the noisy feature vector used to generate the decryption key for decrypting the given group.

25. The apparatus for decrypting data of claim 22, wherein recovery of the data is allowed when decryption of at most three groups is unsuccessful.

26. The apparatus for decrypting data of claim 22, wherein each group of data further comprises an error detecting code.

\* \* \* \* \*